(12) United States Patent
Kensrue et al.

(10) Patent No.: US 7,244,909 B2
(45) Date of Patent: Jul. 17, 2007

(54) WELDING GUN

(75) Inventors: Milo M. Kensrue, Dana Point, CA (US); Trung Dinh Nguyen, Laguna Hills, CA (US)

(73) Assignee: M.K. Products, Inc., Irvine, CA (US)

( * ) Notice: Subject to any disclaimer, the term of this patent is extended or adjusted under 35 U.S.C. 154(b) by 60 days.

(21) Appl. No.: 11/098,773

(22) Filed: Apr. 4, 2005

(65) Prior Publication Data

US 2006/0219683 A1   Oct. 5, 2006

(51) Int. Cl.
*B23K 9/00*   (2006.01)
*B23K 9/12*   (2006.01)

(52) U.S. Cl. ............................... 219/137.31; 219/137.7

(58) Field of Classification Search ........... 219/137.31, 219/137.51, 137.62, 137.7
See application file for complete search history.

(56) References Cited

U.S. PATENT DOCUMENTS

| | | | |
|---|---|---|---|
| 2,289,938 A | 7/1942 | Smith | |
| 2,315,358 A | 3/1943 | Smith | |
| 2,347,646 A | 5/1944 | Smith | |
| 2,379,470 A | 7/1945 | Baird | |
| 2,808,498 A | 10/1957 | Hudson et al. | |
| 3,088,642 A | 5/1963 | Kingsley | |
| 3,142,746 A | 7/1964 | Schmerling | |
| 3,165,662 A | 1/1965 | Norris | |
| 3,176,932 A | 4/1965 | Kovaleski | |
| 3,204,080 A | 8/1965 | Spencer | |
| 3,210,522 A | 10/1965 | Adamson et al. | |
| 3,227,852 A | 1/1966 | Fullerton et al. | |
| 3,305,664 A | 2/1967 | Kensrue | |
| D207,977 S | 6/1967 | Kensrue | |
| 3,334,841 A | 8/1967 | Burhop et al. | |
| 3,338,492 A | 8/1967 | Cornell, Jr. | |
| 3,344,305 A | 9/1967 | Ogden | |
| 3,428,778 A | 2/1969 | Blackman et al. | |
| 3,430,832 A | 3/1969 | Meyer | |
| 3,463,902 A | 8/1969 | Bircher | |
| 3,488,468 A | 1/1970 | Carbone | |
| 3,562,577 A * | 2/1971 | Kensrue | 314/71 |

(Continued)

FOREIGN PATENT DOCUMENTS

EP   0042 311 A1   12/1981

(Continued)

*Primary Examiner*—Kevin P. Kerns
(74) *Attorney, Agent, or Firm*—Knobbe, Martens, Olson and Bear LLP

(57) ABSTRACT

Several aspects of an in-line welding gun are disclosed. In one aspect, the welding gun has a variable profile insulating boot disposed over the torch barrel of the gun. The variable profile insulating boot may include a molded material having varying thickness to provide the desired insulating properties. In another aspect of the welding gun, a speed control mechanism for the motor driving the wire feed assembly is positioned in a recess in the housing such that it reduces the risk of being unintentionally adjusted during operation of the welding gun. In another aspect of the welding gun, the wire feed mechanism features a feeder roller and an idler roller that may be separated without opening the housing of the welding gun. To separate the rollers, the user may depress a portion on the exterior of the housing to press on a pivotable lever on which the idler roller is disposed.

41 Claims, 13 Drawing Sheets

U.S. PATENT DOCUMENTS

| | | |
|---|---|---|
| 3,744,694 A | 7/1973 | Karnes et al. |
| 3,898,419 A | 8/1975 | Smith |
| 4,131,783 A | 12/1978 | Kensrue et al. |
| 4,165,829 A | 8/1979 | Koveshnikov et al. |
| 4,206,862 A | 6/1980 | DaCosta |
| D256,325 S | 8/1980 | Crooks et al. |
| 4,235,362 A | 11/1980 | Hubenko |
| 4,403,136 A | 9/1983 | Colman |
| 4,404,457 A | 9/1983 | Rokujio et al. |
| 4,575,612 A | 3/1986 | Prunier |
| 4,617,447 A | 10/1986 | O'Donohue |
| 4,727,238 A | 2/1988 | Mann |
| 4,733,052 A | 3/1988 | Nilsson et al. |
| 4,845,336 A | 7/1989 | Samokovlivski et al. |
| 4,885,453 A | 12/1989 | Martin |
| 4,954,690 A * | 9/1990 | Kensrue ............... 219/137.31 |
| 5,132,513 A | 7/1992 | Ingwersen et al. |
| D329,179 S | 9/1992 | Kensrue |
| D343,629 S | 1/1994 | Bode |
| D346,390 S | 4/1994 | Sperling et al. |
| 5,326,958 A | 7/1994 | Geus |
| 5,338,917 A * | 8/1994 | Stuart et al. ........... 219/137.63 |
| 5,488,217 A | 1/1996 | Ni |
| 5,586,709 A | 12/1996 | Del Fabro et al. |
| 5,595,671 A | 1/1997 | David |
| D382,500 S | 8/1997 | Johnson et al. |
| 5,728,995 A | 3/1998 | Kensrue |
| 5,738,264 A | 4/1998 | Jackson et al. |
| 5,782,394 A | 7/1998 | Langley |
| 5,816,466 A | 10/1998 | Seufer |
| 6,025,574 A | 2/2000 | Colangelo, Jr. |
| 6,064,036 A | 5/2000 | Kensrue |
| RE36,997 E | 12/2000 | Kensrue |
| 6,225,599 B1 | 5/2001 | Altekruse |
| 6,271,497 B1 | 8/2001 | Zapletal |
| D456,678 S | 5/2002 | Karten |
| 6,427,894 B1 | 8/2002 | Blank et al. |
| 6,559,416 B1 | 5/2003 | Steenis et al. |
| 6,568,578 B1 | 5/2003 | Kensrue |
| 6,649,858 B2 | 11/2003 | Wakeman |
| 6,710,300 B2 | 3/2004 | Steenis et al. |
| 6,740,848 B2 | 5/2004 | Parker |
| 6,824,735 B2 | 11/2004 | Pryor |
| 6,998,575 B1 * | 2/2006 | Kensrue ............... 219/137.31 |
| 2003/0209530 A1 | 11/2003 | Stuart et al. |

FOREIGN PATENT DOCUMENTS

WO    WO 03/039800 A1    5/2003

* cited by examiner

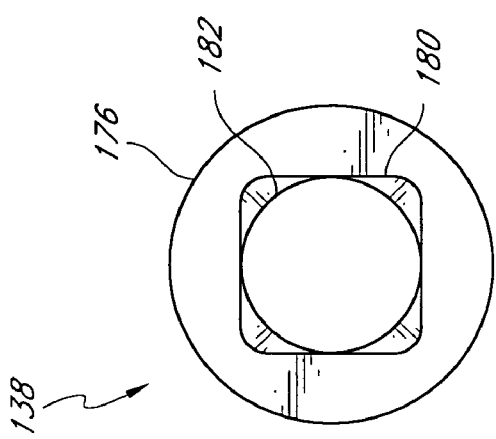
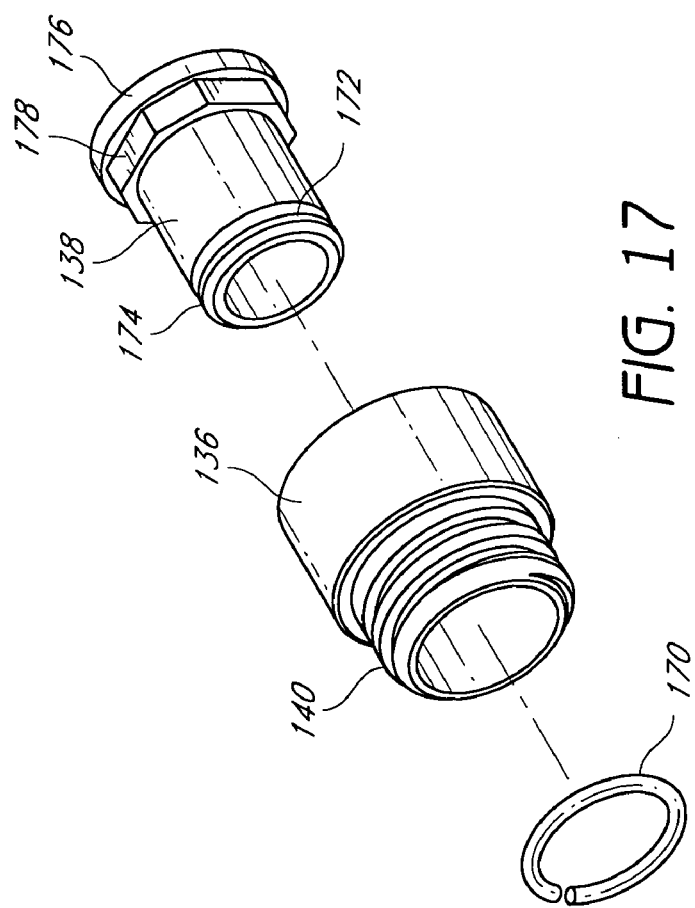

WELDING GUN

BACKGROUND OF THE INVENTION

1. Field of the Invention

This invention relates generally to a welding gun and, more specifically, to an in-line MIG welding gun.

2. Description of the Related Art

A MIG welding gun generally comprises a handle, a wire feed mechanism, a motor for driving the wire feed mechanism and a torch barrel. The welding gun typically also includes a gas tube and a cooling fluid tube for supplying gas and cooling fluid to the tip of the torch barrel.

There are two general types of welding guns: pistol grip and in-line welding guns. In a pistol grip gun, the motor is located below the wire feed mechanism and lies along an axis that lies generally perpendicular to the longitudinal axis of the gun. In contrast, in an in-line gun, the motor lies along the longitudinal axis of the gun and is positioned generally behind the wire feed mechanism.

Torch barrels may be straight or curved (e.g., "goose necked") depending upon the type of welding to be accomplished and the preferences of the welder. In some arrangements, the welding gun is configured such that the operator can change the angular position of a curved barrel relative to the wire feed mechanism. Such welding guns generally require relatively complicated connections between the torch barrel and the gas and cooling fluid tubes. In contrast, welding guns in which the torch barrel is stationary are relatively less complicated and expensive. As such, welding guns with stationary torch barrels are particularly popular.

SUMMARY OF THE INVENTION

One particularly popular type of welding gun has been sold by MK Products Inc. of Irvine, Calif. under the trade name Cobra™. This welding gun is an in-line welding gun with a stationary torch barrel. To protect the user, the torch barrel in this welding gun is embedded in an insulating material by compression molding. This technique for insulating the torch barrel has become unsatisfactory because during manufacturing the compression molding may collapse the tubes in the torch barrel, in which case the torch barrel is discarded. In addition, if the torch barrel becomes damaged after being sold, the insulating material is difficult to remove, making repairs to the torch barrel difficult if not impossible. Another approach to insulating the torch barrel has been to encase the torch barrel and the handle portion of the welding gun in a substantially rigid shell such as a two-piece housing. This rigid shell approach was disclosed in a currently pending patent application for an invention entitled "Welding Gun," application Ser. No. 10/370,043 filed Feb. 19, 2003, now U.S. Pat. No. 6,998,575, which is incorporated herein in its entirety by reference. This substantially rigid shell construction addressed the manufacturing efficiency concerns of the prior compression molding process, but it proved difficult to achieve a rigid shell construction with the desired cost of materials, cost of manufacture, and insulating properties. Therefore, there remains a need for a torch barrel insulator having relatively low materials costs and manufacturing costs and desired thermal and electrical insulating properties. Furthermore, it is a goal of the present invention to provide a torch barrel insulator that can obtain a desired outer shape for the welding gun.

Another problem associated with prior art welding guns is that the user control for the speed control mechanism of the wire feed assembly has been positioned on the base of the handle portion of a welding gun such that the user may unintentionally adjust the speed of wire feed during operation of the gun. Also, the positioning of the speed control mechanism of prior art welding guns rendered these speed control mechanisms prone to damage in certain instances where the welding guns were dropped or improperly reassembled. Therefore, there is a need for an improved speed control mechanism for a welding gun that is configured to prevent unintentional adjustment during use of the welding gun and to avoid damage to the speed control mechanism caused by user droppage or improper assembly of the welding gun.

In order to remove tension from the wire, to enable operations such as feeding or removing a wire with the prior art welding guns, a user would have to open an access port on the welding gun housing, then use a cam arm on the wire feed mechanism to separate the idler roller from the feeder roller (such as, to allow the wire to be advanced into or retracted from the welding gun). This process was time consuming and cumbersome, as a user, often with a gloved hand, would attempt to access a fairly small cam arm through an access port of limited size. Additionally, the cam arm of the wire feed mechanism contributes to the cost and complexity of the prior art wire feed mechanism. Therefore, it would also be advantageous to provide a welding gun configured to quickly allow a user to remove tension from the wire, such as to advance or retract a wire from the gun without opening the housing of the gun. Furthermore, it would also be advantageous to provide a welding gun with a simplified wire feed mechanism that allows separation of the idler roller from the feeder roller without the use of a cam arm.

Additionally, prior art welding gun designs feature welding tip assemblies having gas cups that are multilayer assemblies including an exterior gas cup surface, an insulating layer, and an internal thread component. The various layers are swaged into a single component. Gas cups of welding guns are wear items that are consumed through normal operation of the welding gun. Given the consumable nature of gas cups, the prior art multilayer swaged sandwich construction has posed relatively high manufacturing costs and recurrent costs to users. Therefore, it would be advantageous to provide a welding gun with a gas cup configuration that allows for relatively low cost manufacturing and assembly.

Accordingly, one aspect of an embodiment of the present invention involves a welding gun with a generally tubular portion comprising a substantially rigid housing. A wire feed mechanism is positioned within the generally tubular portion. The welding gun also comprises a motor to drive the wire feed mechanism and a torch portion. The torch portion of the welding gun comprises a torch barrel configured to receive a welding tip assembly and a variable profile insulating boot disposed around the torch barrel. The variable profile insulated boot may be comprised of a relatively low cost material with desired heat insulating properties that is moldable to achieve a desired shape.

Another aspect of an embodiment of the present invention is a welding gun with a generally tubular portion comprising a substantially rigid housing. A wire feed mechanism is positioned within the generally tubular portion. The welding gun also comprises a motor to drive the wire feed mechanism and a torch portion. The motor is electronically coupled to a speed control located in the welding gun such that its user control is not easily unintentionally adjusted when the welding gun is in operation. This positioning may be within a recess formed in the generally tubular portion. The torch portion of the welding gun comprises a torch barrel configured to receive a welding tip assembly.

Another aspect of an embodiment of the present invention is a welding gun with a generally tubular portion comprising a substantially rigid housing. A wire feed mechanism is positioned within the generally tubular portion. The welding gun also comprises a motor to drive the wire feed mechanism and a torch portion. The wire feed mechanism may include an idler roller, a feeder roller, and a block configured to support the idler and feeder rollers such that they rotate about axes that extend generally perpendicular to a longitudinal axis of the generally tubular portion. To facilitate initial feed or removal of a wire from the wire feed mechanism, the idler roller may be disposed on a pivotable lever allowing the idler roller to be pivoted away from the feeder roller without opening the substantially rigid shell. The torch portion of the welding gun comprises a torch barrel configured to receive a welding tip assembly.

Still another aspect of an embodiment of the present invention is a welding gun with a generally tubular portion comprising a substantially rigid housing. A wire feed mechanism is positioned within the generally tubular portion. The welding gun also comprises a motor to drive the wire feed mechanism and a torch portion. The torch portion of the welding gun comprises a torch barrel, and a welding tip assembly connected to the torch barrel and comprising a gas cup and a welding tip connected to the torch barrel. The gas cup is a relatively low cost machined component having internal threads in an inner surface of the gas cup. The welding tip assembly further comprises a replaceable insulating insert positioned on a distal end of the torch barrel. Therefore, a relatively expensive swaged multilayer gas cup is no longer used as a wear component of the welding gun.

BRIEF DESCRIPTION OF THE DRAWINGS

FIG. 17 is an exploded perspective view of a gas cup retainer;

FIG. 18 is an end view of an insulator of the gas cup retainer of FIG. 17.

DETAILED DESCRIPTION OF THE PREFERRED EMBODIMENT

Figure 1:
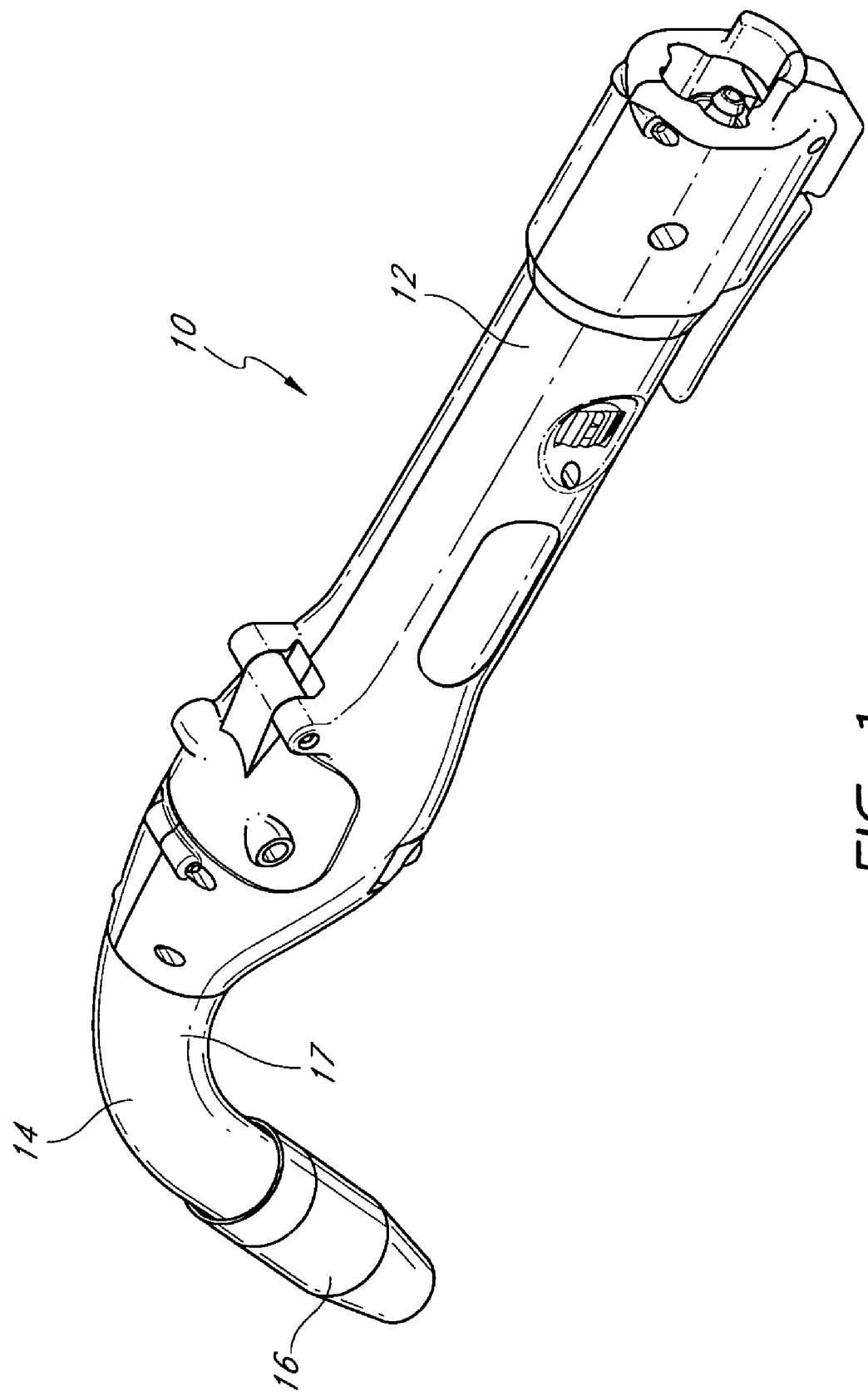
FIG. 1 is a perspective view of a welding gun according to an embodiment of the invention.
Figure 2:
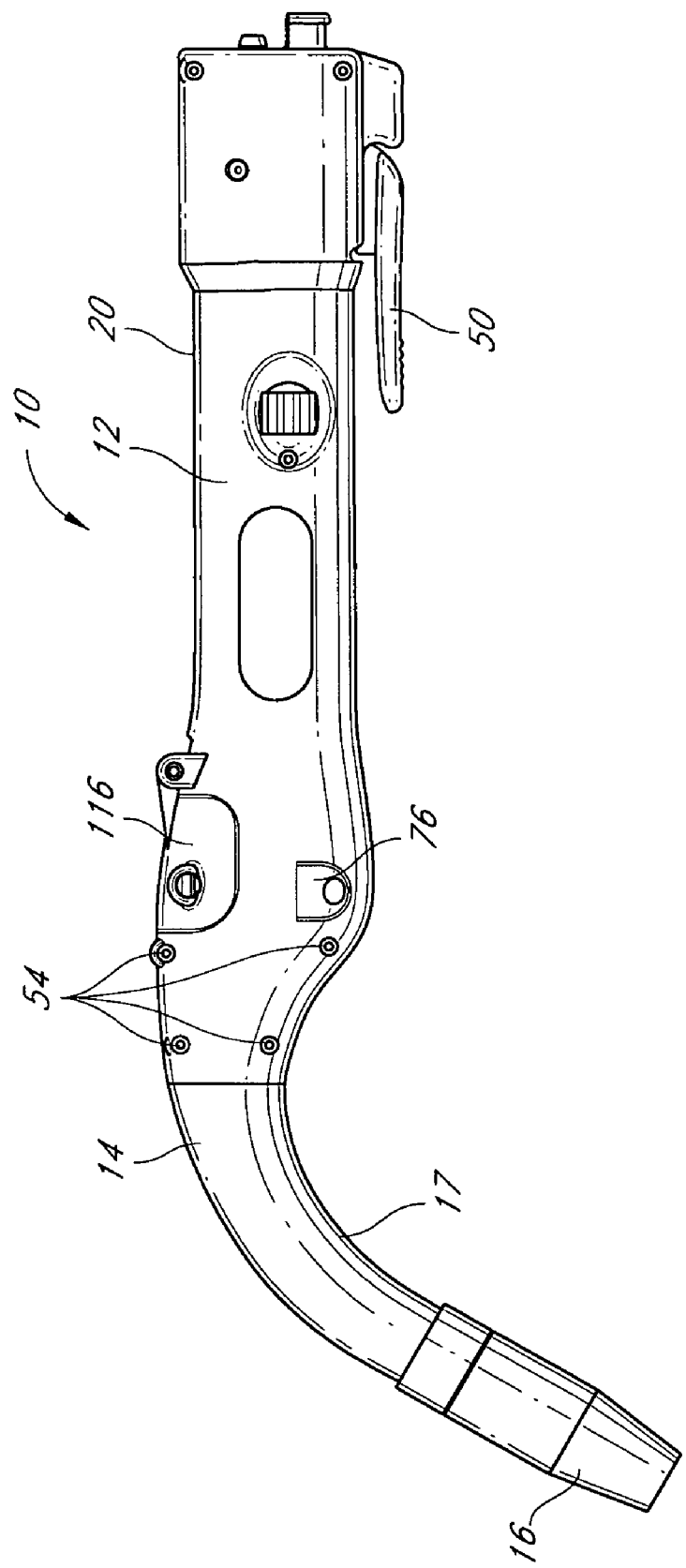
FIG. 2 is a side view of the welding gun depicted in FIG. 1.
Figure 3:
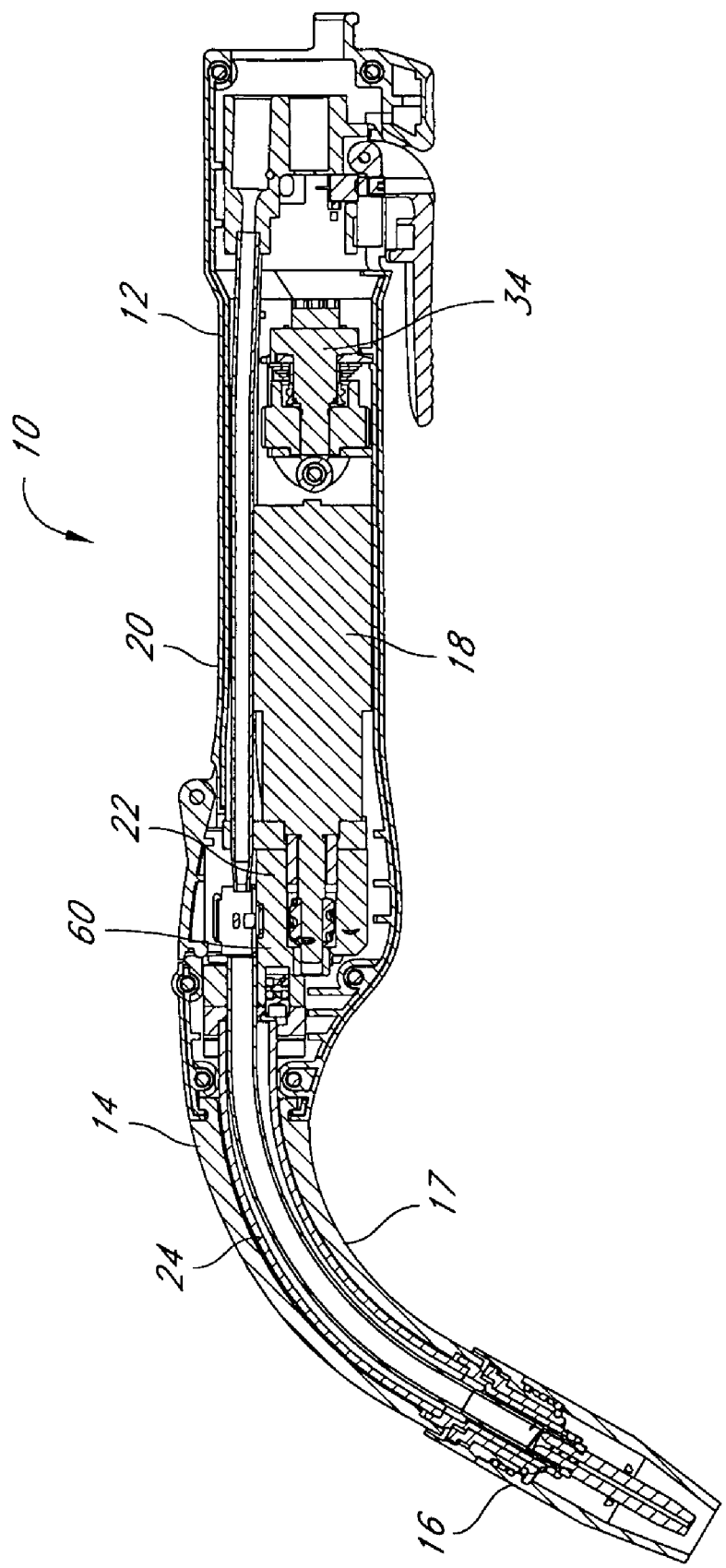
FIG. 3 is a longitudinal cross sectional view of the welding gun depicted in FIG. 1.

FIGS. 1 and 2 are a side perspective view and a side view of an illustrated embodiment of a welding gun 10 having certain features and advantages according to the present invention. In the illustrated embodiment, the gun 10 includes a generally tubular handle 12 and a torch portion 14. As best seen in FIG. 3, the gun 10 has a wire-feed motor 18, which is positioned inside the handle 12 generally along the longitudinal axis of the gun 10. The illustrated gun 10, therefore, is an "in-line" welding gun. The handle portion 12 is covered by a substantially rigid, two-piece molded plastic housing 20a, 20b, which is best seen in FIG. 4 and will be described in more detail below.

Figure 4:
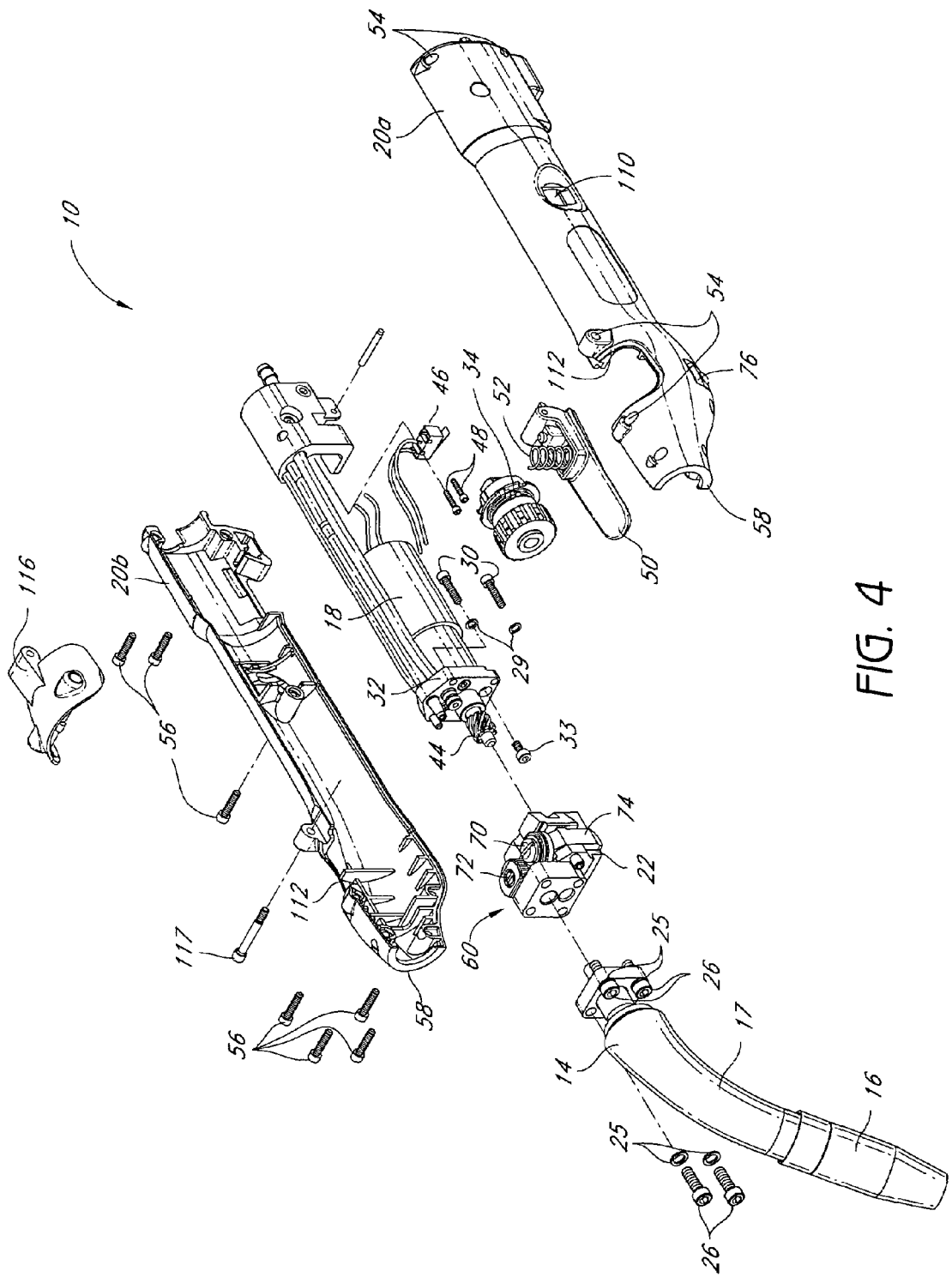
FIG. 4 is an exploded perspective view of the welding gun depicted in FIG. 1.

With particular reference to FIGS. 3 and 4, the torch portion 14 comprises the torch barrel 24, a variable profile insulating boot 17. The torch barrel 24 is configured to receive a welding tip assembly 16. The welding gun 10 includes a body or block 22, which is preferably made of aluminum. The torch barrel 24 (see also FIG. 5) is removably attached to a distal end of the block 22 by washers 25 and bolts 26, which extend through a barrel mount 28 and into the block 22. In a similar manner, the motor 18 removably attached to a proximal end of the block 22 by washers 29 and bolts 30, which extend through a motor mount 32 that is also attached to the motor 18 by bolts 33. The motor 18 includes a drive shaft 44, which extends desirably into the block 22.

As will be described below in more detail, a wire feed mechanism 60 comprises the block 22, an idler roller 70, and a feeder roller 72. A feeder roller 72 is coupled to a shaft 82, which extends into the block 22 and is driven by the drive shaft 44 (FIG. 8B). The idler roller 70 is mounted on a lever 74 that pivots so that the idler roller 70 can be moved towards or away from the feeder roller 72.

A speed control mechanism 34, for controlling the speed of the motor, is electronically coupled to the motor 18. The speed control mechanism 34 may be accessible to a user through at least one recess 110 in the plastic housing 20a, 20b. The plastic housing 20a, 20b, encloses the block 22, the torch barrel 24 and the motor 18 when these components are assembled together.

A micro switch 46 is located at the proximal end of the handle portion of the housing 12, and attached to the welding gun by bolts 48. The micro switch 46 is activated by a contact arm 50 which is biased by a spring 52 and, when actuated, closes the switch 46 to allow electrical energy to drive the motor 18. The micro switch 46 is electrically connected through an external control unit to the speed control mechanism 34 and the motor 18. The speed control mechanism 34 includes a control unit 90 (FIG. 12), which is adjusted through a user input mechanism 92 (FIG. 12) such as a control wheel.

The housing 20 is preferably molded of a suitable plastic material which serves as both an electrical and heat insulation. The housing 20 is divided into two sections 20*a* and 20*b* which are essentially mirror images of one another and include a series of mounting sites 54 along their edges which allows the housing to be screwed together by screws 56 that are received in the mounting sites 54. The two sections 20*a,b* preferably also form interlocking lap joints 112 to facilitate a smooth fit. The sections 20*a,b* fit snugly around and cover the mounting block 22, motor 18, and the speed control mechanism 34. As such, in the illustrated arrangement, the housing 20 terminates at its distal end at the proximal end of the torch barrel 24 and at its proximal end behind the motor 18. At the distal end, housing 20 may have a flange 58 extending radially inward and configured to mate with an annular recess in the variable profile insulating boot 17 to secure the housing 20 around the insulating boot 17. This housing 20 has an opening 112 to provide access to the feeder and idler rollers 72, 70. A door 116 is preferably covers the opening 112 and is attached to the housing by a hinge 117. The housing 20 electrically isolates the block 22 and the torch barrel 24.

The Variable Profile Insulating Boot

Figure 6:
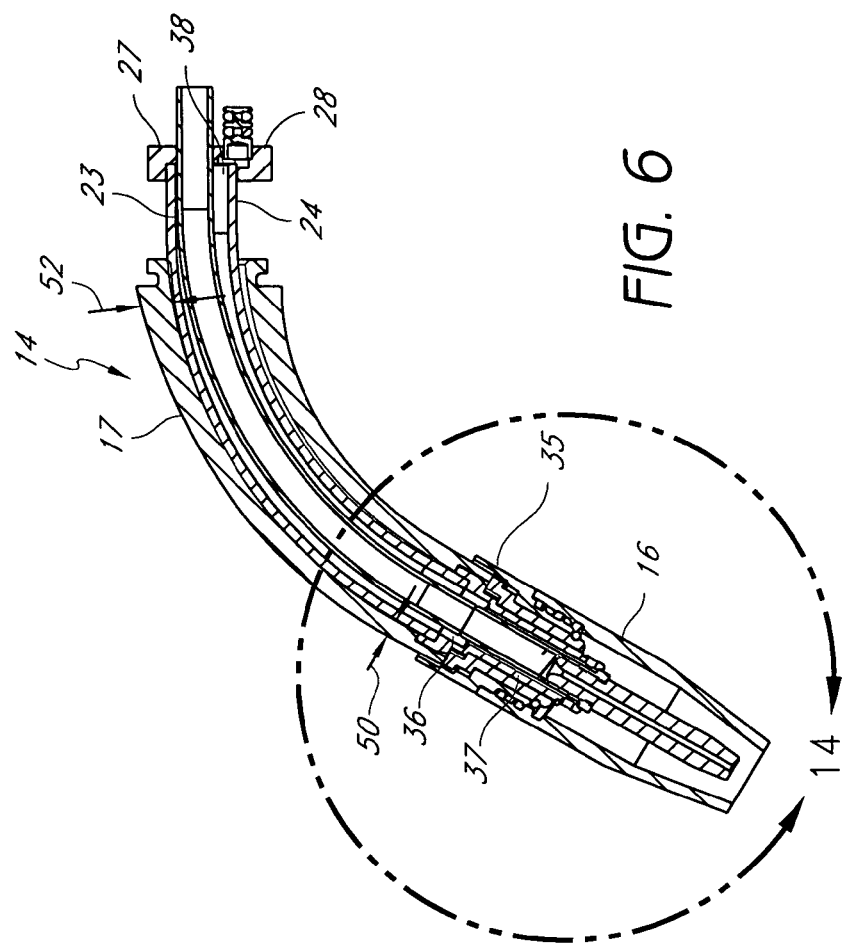
FIG. 6 is a longitudinal cross sectional view of the torch portion depicted in FIG. 5.
Figure 5:
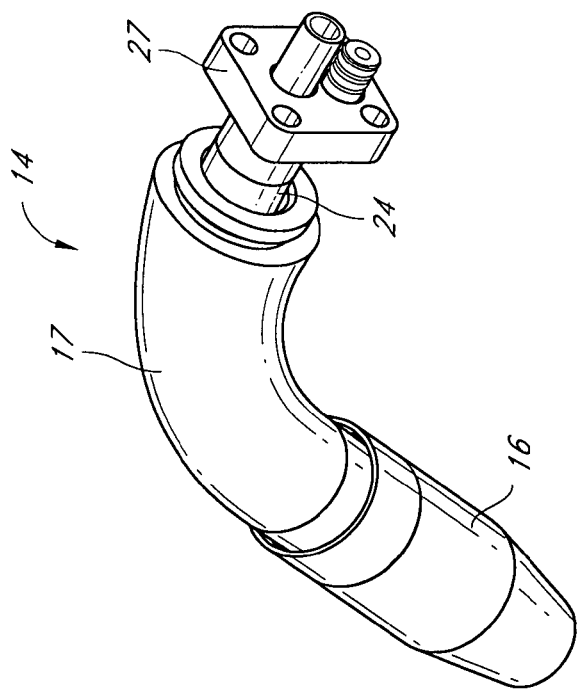
FIG. 5 is a perspective view of a torch portion of a welding gun according to an embodiment of the invention.

The torch portion 14 and torch barrel 24 will now be described in more detail with reference to FIGS. 5–6. As best seen in FIG. 3, the torch barrel 24 may extend along a line that curves away from a longitudinal axis of the welding gun 10. As illustrated in FIG. 6, the torch barrel 24 of the torch portion 14 includes an outer sheath 23, which defines a barrel cavity 38. The barrel cavity 38 is closed at the proximal end 27 by the barrel mount 28 and at the distal end 35 by a cap 36. A gas nozzle 37 is fitted over the cap 36 and the distal end 35 of the barrel 24.

The torch portion also includes a variable profile insulating boot 17 surrounding the torch barrel 24. The variable profile insulating boot may have a first thickness 50 at its end adjacent the welding tip assembly 16 and a second thickness 52 at an end adjacent the generally tubular handle 12 (FIG. 1–3). Preferably, the second thickness 52 is greater than the first thickness 50 such that the variable profile insulating boot provides greatest insulation of the torch barrel 24 at a location near a hand of a user. Preferably, the first thickness 50 is about 1/16 inches and the second thickness 52 is about 1/4 inches. Preferably, the variable profile insulating boot 17 has a gradual profile change from the end of the insulating boot 17 adjacent the welding tip assembly 16 to the end of the insulating boot 17 adjacent the generally tubular handle portion 12. The insulating boot 17 may be shaped to form a predetermined outer configuration of the welding gun 10. The predetermined outer configuration may be a shape in which an outer surface of the insulating boot 17 is substantially continuous with the generally tubular handle 12.

Various physical properties, including moldability and insulating capacity, may be considered when choosing a material for the variable profile insulating boot 17. The variable profile insulating boot 17 is preferably comprised of a material that is moldable, and preferably one that is moldable by injection molding. A moldable material allows for relatively low cost manufacture of the insulating boot 17, while allowing an outer surface of the insulating boot 17 to be molded to a desired shape. While the thickness of the insulating boot 17 may be varied to meet insulating requirements, the design of the outer surface of the insulating boot 17 is purely ornamental and may be configured as desired to form an aesthetically pleasing exterior shape. Thus, both the desired shape and insulative characteristics can be achieved in a low cost, easy to manufacture boot. The variable profile insulating boot 17 is comprised of a material which retains its insulating properties at temperatures over 400° F., desirably over 475° F., and preferably at temperatures up to about 550° F. The insulating boot 17 is preferably comprised of a silicone rubber material that is moldable and insulates when exposed to temperatures over 400° F., desirably over 475° F., and preferably up to about 550° F., although other materials which have the desired moldability and heat insulation properties may also be considered within the scope of the present invention.

The Wire Feed Mechanism

With particular reference to FIGS. 7–10, the welding gun 10 also includes a wire feed mechanism 60, preferably located in the generally tubular handle 12 (FIG. 3). F*igure* 7 illustrates a perspective view of a wire feed mechanism 60. The wire feed mechanism 60 comprises an idler roller 70, a feeder roller 72, and a body configured to support the idler 70 and feeder 72 rollers such that they rotate about axes that are transverse to a longitudinal axis of the generally tubular handle 12. The idler roller 70 is disposed on a lever 74 such that the idler roller is configured to be pivotable away from the feeder roller 72 without opening the housing 20*a*, 20*b* of the welding gun 10 (FIG. 4). One of the housing halves 20*a*, 20*b* may include a depressible portion or button 76 (FIG. 2 and 3) located outside the lever 74 of the wire feed mechanism 60 to allow a user to separate the idler roller 70 from the feeder roller 72 by pivoting the lever 74 without opening the housing halves 20*a*, 20*b*. The button 76 is desirably supported by the housing and is desirably integrally formed therewith. While not preferred, the button could protrude through an opening in the housing and be mounted on a separate component, such as the lever 74. The body configured to support the idler roller 70 and the feeder roller 72 is preferably the block 22 of the wire feed mechanism 60, which, as described above, also provides mountable attachment for the torch barrel 24 and the motor 18 (FIG. 4).

Figure 8:
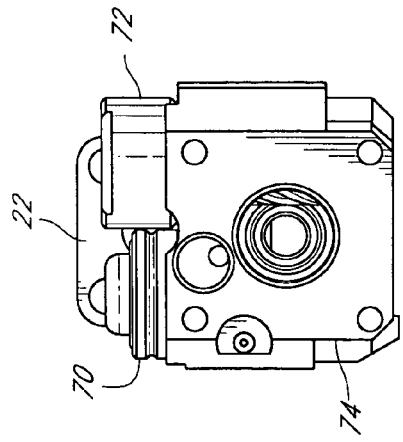
FIG. 8 is an end view of the wire feed mechanism of FIG. 7, wherein the idler roller is in a first position.
Figure 8B:
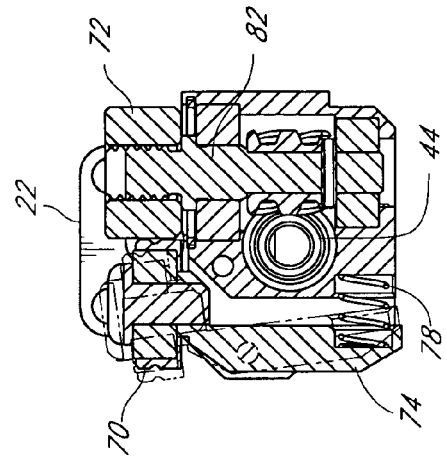
FIG. 8B is a cross sectional view of the wire feed mechanism of FIG. 7.
Figure 7:
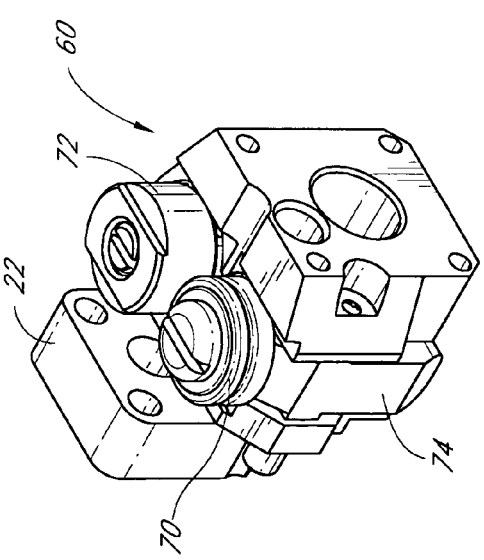
FIG. 7 is a perspective view of a wire feed mechanism of a welding gun according to an embodiment of the present invention.
Figure 8A:
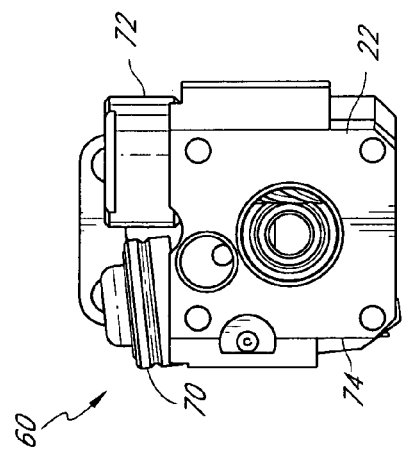
FIG. 8A is an end view of the wire feed mechanism of FIG. 7, wherein the idler roller is in a second position.

FIGS. 8 and 8A are end views of the wire feed mechanism 60 illustrating the pivotably separable nature of the idler roller 70 and the feeder roller 72. FIG. 8B is a cross sectional view illustrating the pivotably separable nature of the rollers 70, 72. The idler roller 70 of the wire feed mechanism 60 is pivotable between a first position (depicted in FIG. 8) in which the idler roller is positioned to maintain contact between a wire and the feeder roller 72, and a second position (depicted in FIG. 8A) in which the idler roller 70 is separated from the feeder roller 72. The idler roller 70 is preferably biased towards the first position.

Figure 10:
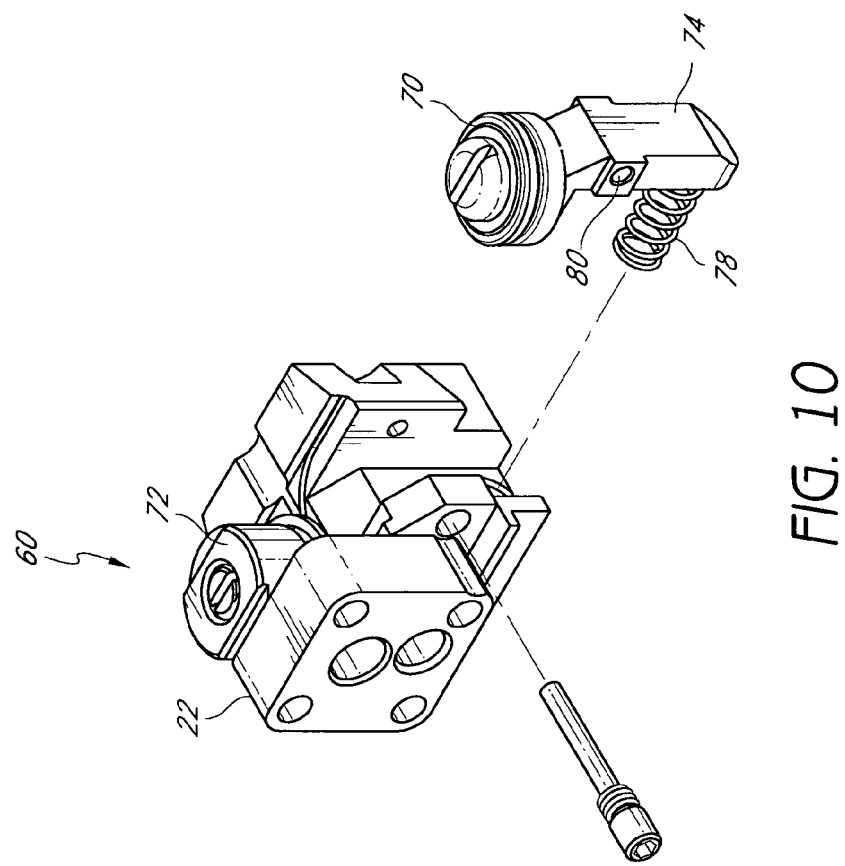
FIG. 10 is a partially exploded perspective view of the wire feed mechanism of FIG. 7.
Figure 9:
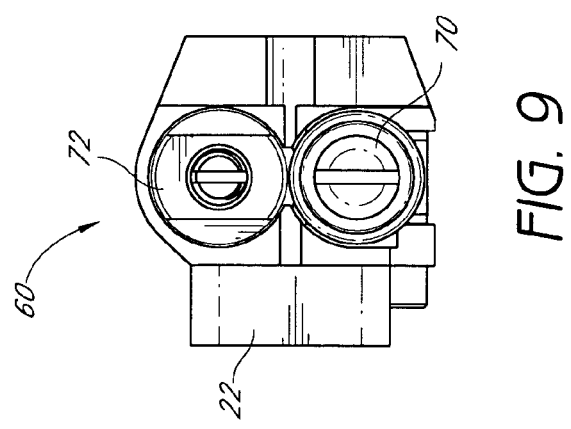
FIG. 9 is a top view of the wire feed mechanism of FIG. 7.

As depicted in the partially exploded view of the wire feed mechanism 60 in FIG. 10, the idler roller 70 may be biased towards the first position by a coil spring 78. The coil spring has a first end positioned on a lower portion of the lever 74 and a second end positioned on a surface of the block 22 facing the lever 74. Recesses may be formed in the surfaces of the lever 74 and the block 22 to retain the coil spring 78. The lever 74 desirably has a pivot point 80 located closer to the idler roller 70 than the point of contact of the coil spring 78 with the lever 74, such that as the coil spring 78 exerts a force on the lever 74, the upper portion of the lever 74, on which the idler roller 70 is disposed, is pivoted towards the feeder roller 72 and benefits from the mechanical advantage of the lever 74. When the lower portion of the lever 74 is depressed towards the block 22, thereby compressing the coil spring 78, the idler roller 70 is pivoted away from the feeder roller 72. The lower portion of the lever 74 may be easily depressed by a user applying force to a depressible portion. The depressible portion is preferably formed 76 on one of the housing halves 20*a*, 20*b* of the generally tubular portion 12. Therefore, advantageously, even a user whose dexterity is reduced due to gloves may easily separate the idler roller 70 from the feeder roller 72 to load or withdraw a wire from the welding gun 10 without opening the housing halves 20a, 20b. Furthermore, the wire feed mechanism 60 does not need a separate cam arm connected to the block 22 and only accessible from inside the housing halves 20a, 20b to allow for the separation of the idler 70 and feeder 72 rollers, thus reducing manufacturing and assembly complexities and costs of the wire feed mechanism 60.

The Speed Control Mechanism

Figure 11:
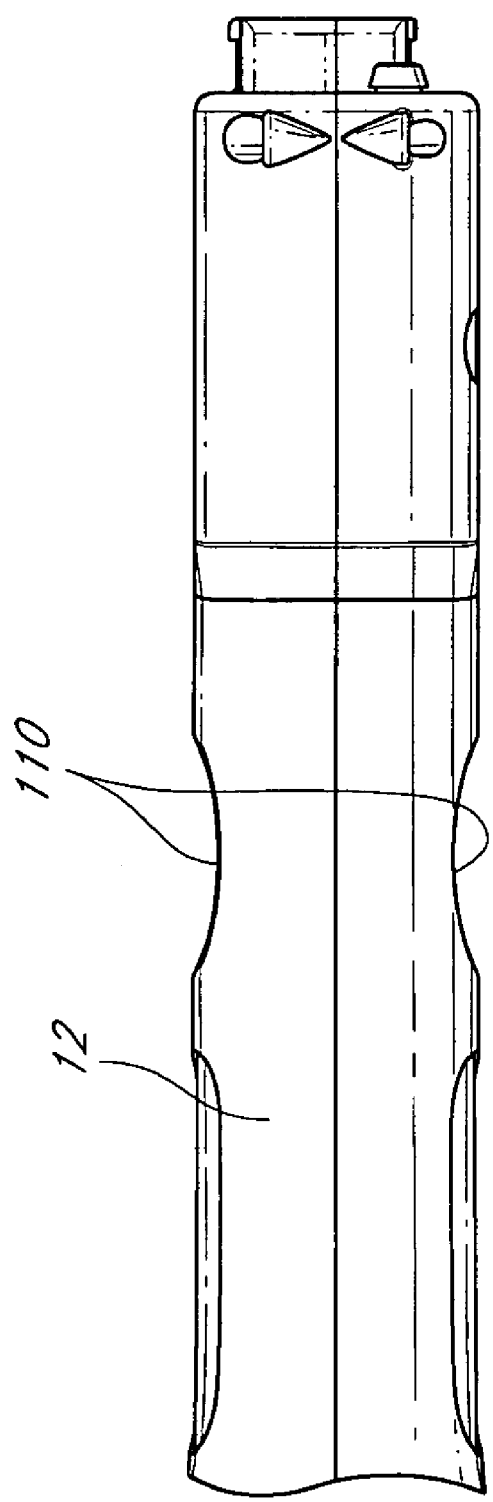
FIG. 11 is a top view of a rear portion of a welding gun according to an embodiment of the present invention.
Figure 12:
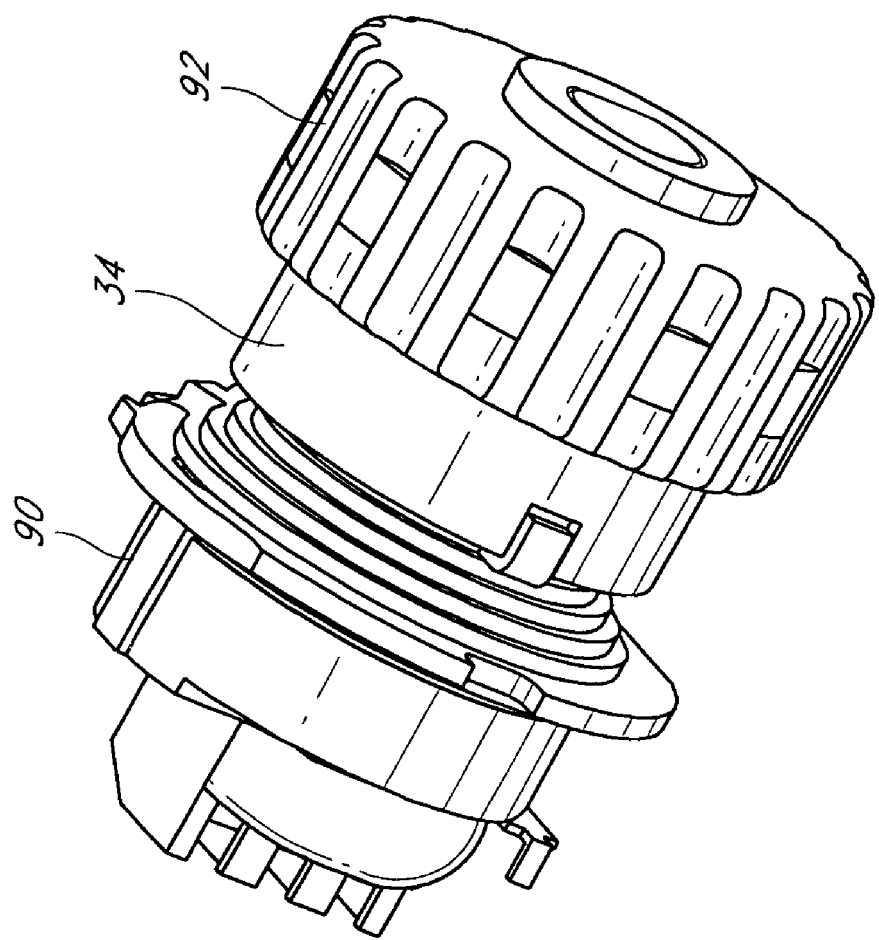
FIG. 12 is a perspective view of a speed controller for a motor of a welding gun according to an embodiment of the present invention.

The welding gun 10 of the present invention may include a speed control mechanism 34 electrically connected to the motor such that a user may adjust the speed of wire feed of the welding gun 10 (FIGS. 3 and 4). As depicted, the motor 18 (FIGS. 3 and 4) extends along a length and, preferably, along an axis of the generally tubular handle portion 12. The speed control mechanism 34 is desirably positioned within the generally tubular handle portion 12 behind the motor 18. FIGS. 11 and 12 illustrate various aspects of the configuration and placement of the speed control mechanism of the welding gun 10. The speed control mechanism 34 comprises a control unit 90 and a user input mechanism 92 coupled to the control unit.

The speed control mechanism 34 is preferably positioned within the generally tubular handle portion 12 such that the user input mechanism 92 is accessible through at least one recess 110 in the generally tubular handle portion 12. Although it is recognized that the user input mechanism may be accessible through a single recess 110 in the handle portion 12, preferably the user input mechanism 92 is accessible through two recesses 110 located longitudinally even and angularly opposed approximately 180° from each other on the generally tubular handle portion 12, as depicted in FIGS. 4 and 11. Advantageously, two angularly opposed recesses 110 in the handle portion 12 provide access to the user input mechanism 92 equally to a right-handed or left-handed user. Preferably the recesses 110 in the handle portion 12 are located such that one of the recesses 110 is approximately under the palm of a user when the welding gun 10 is being used. Preferably, one of the recesses 110 is located under the middle portion of the palm, positioned approximately mid-way between the pinky and index finger on a first axis, and approximately mid-way between the wrist and base of the fingers on a second axis approximately perpendicular to the first axis. Advantageously, placement of the user input device 92 under the palm of a user greatly reduces the risk that the speed control mechanism 34 will be unintentionally adjusted during operation of the welding gun 10. This under palm location, approximately halfway between a lower surface of the handle portion 12 and an upper surface of the handle portion 12 also greatly reduces the risk that the speed control mechanism will be damaged if the welding gun 10 is unintentionally dropped.

The control unit 90 is preferably a rotary potentiometer. Alternately, the control unit 90 may be a digital encoder. The control unit 90 may have an adjustment range of any number of rotations of an input shaft. The control unit 90 may have an adjustment range of greater than 2 revolutions of the input shaft, desirably greater than 2½ revolutions, more desirably greater than 3 revolutions, and preferably has an adjustment range of approximately 3½ revolutions of the input shaft. Desirably, the control unit 90 has an adjustment range of no more than 10 revolutions of the input shaft, more desirably no more than 7 revolutions, and preferably has an adjustment range of no more than 5 revolutions of the input shaft. Such an adjustment range allows enough fine adjustment to provide a user with precise control of the speed of the motor, but enough coarse control to permit a user to rapidly make large adjustments to the motor speed.

The user input mechanism 92 is preferably a control wheel mechanically coupled to an input shaft of the control unit and having an outer diameter that is smaller than an outer diameter of the handle portion 12 such that the user input mechanism 92 is recessed from the outer surface of the handle portion 12. The control wheel may be textured to permit easy adjustment of the user input mechanism 92 by a user with gloved hands. As depicted in FIG. 4, the rotary potentiometer and the control wheel have an axis of rotation that is substantially parallel to a longitudinal axis of the handle portion 12. The configuration and positioning of speed control mechanism 34 depicted in FIG. 4 facilitates quick and easy assembly of the housing halves 20a,b with the speed control mechanism 34, thereby reducing the chances of damage to the speed control mechanism due to an improper assembly of the welding gun 10.

The Welding Tip Assembly

Figure 13:
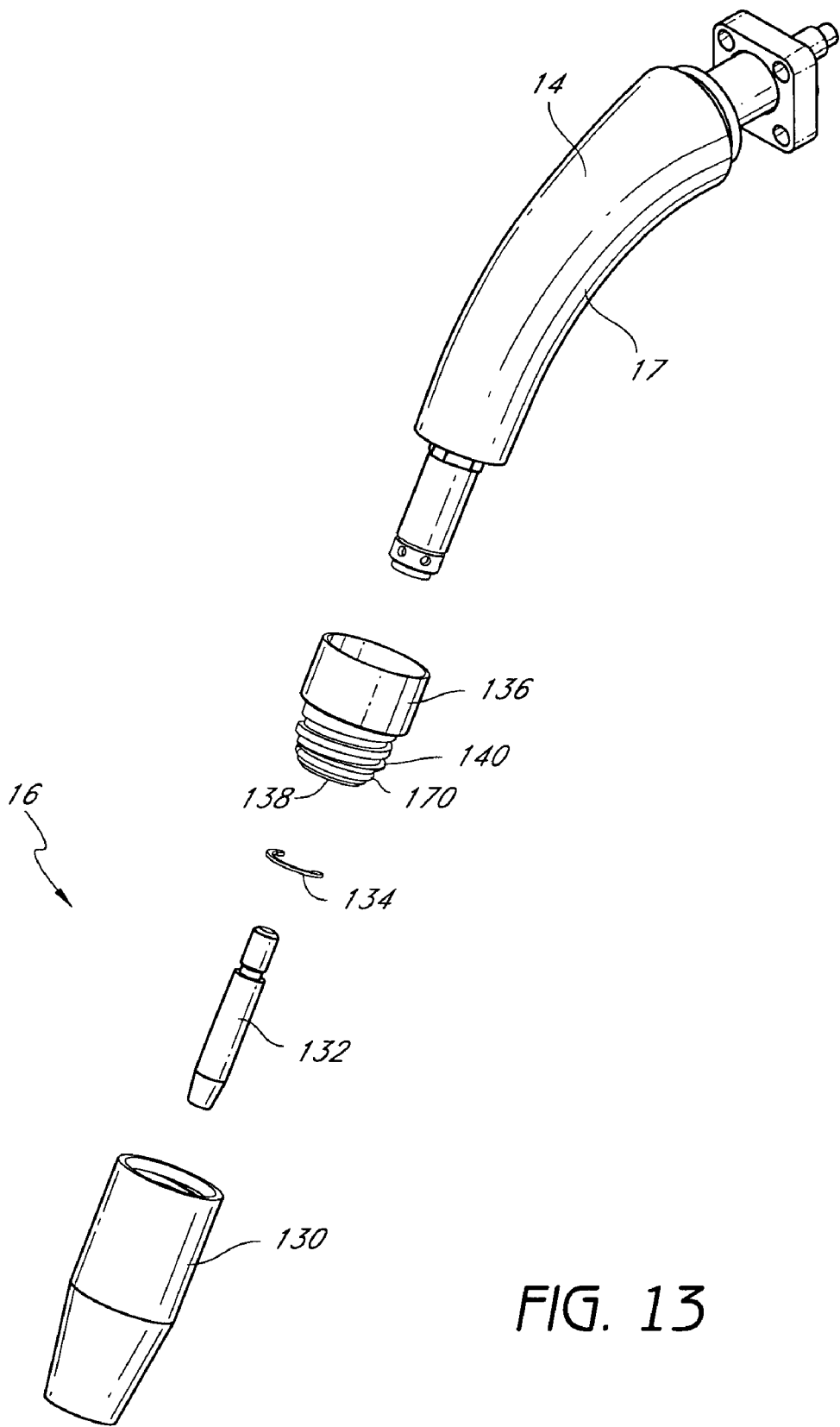
FIG. 13 is an exploded perspective view of a welding tip of a welding gun of the present invention.
Figure 14:
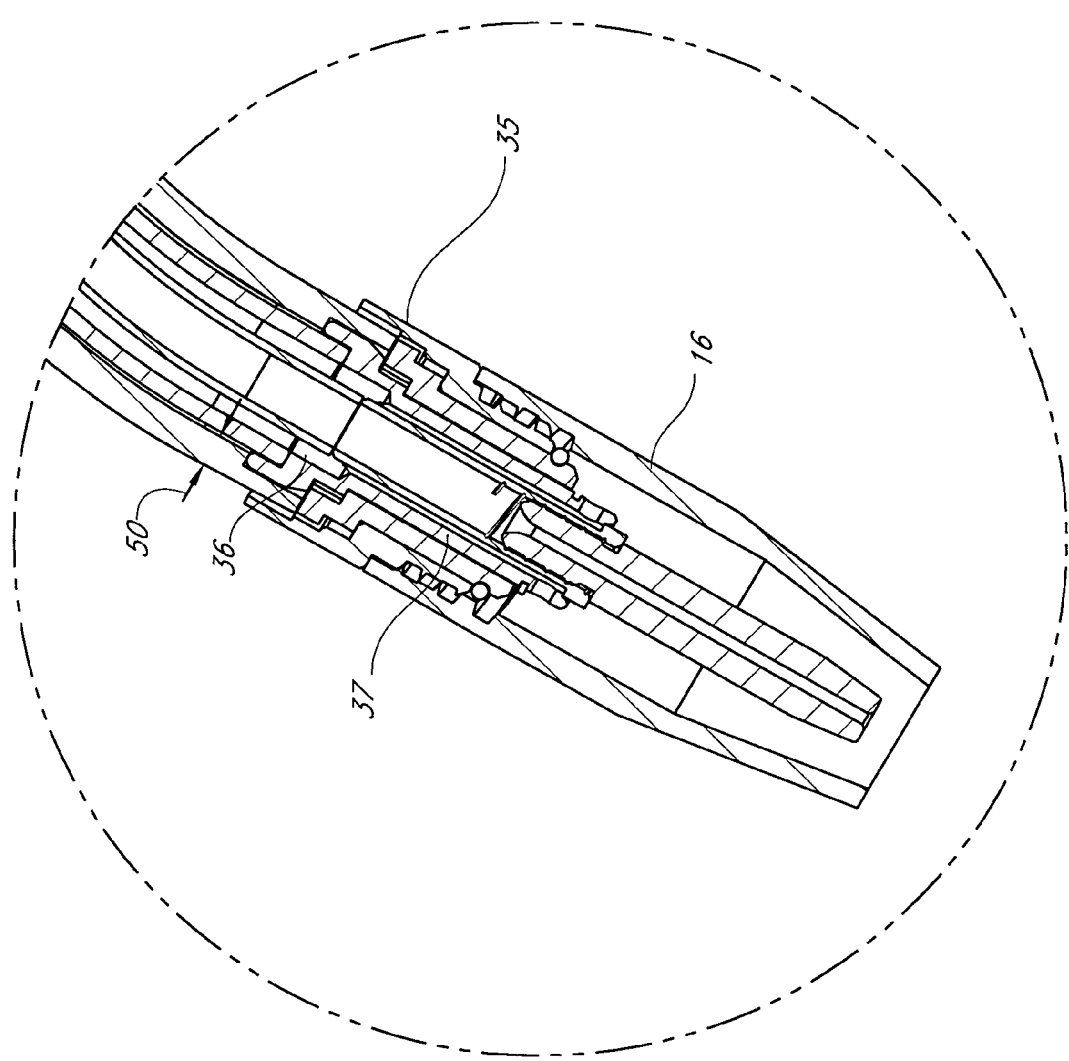
FIG. 14 is a longitudinal cross section view of the welding tip of FIG. 13.

Another aspect of an embodiment of the present invention is an improved welding tip assembly 16. FIGS. 13–18 illustrate the improved welding tip assembly. FIG. 13 is an exploded perspective view of the welding tip assembly 16. The welding tip assembly 16 comprises a welding tip assembly retainer 136 having a threaded portion 140 that is affixed to an end of the torch barrel 24. The welding tip assembly retainer 136 has a ring spring 170 affixing the welding tip assembly retainer 136 to an insulating insert 138 as depicted in FIG. 17. As depicted, the welding tip assembly retainer 136 is affixed to the torch barrel 24 with a spring clip 134 that seats in an annular recess of the gas nozzle 37. The gas nozzle 37 at the distal end of the torch barrel 24 has an inner threaded portion that allows attachment of a welding tip 132 having a mating threaded portion. A gas cup 130 having an inner threaded portion mates with the threaded portion 140 on the welding tip assembly retainer 136. FIG. 14 is a cross-sectional view illustrating the welding tip assembly 16.

Figure 16:
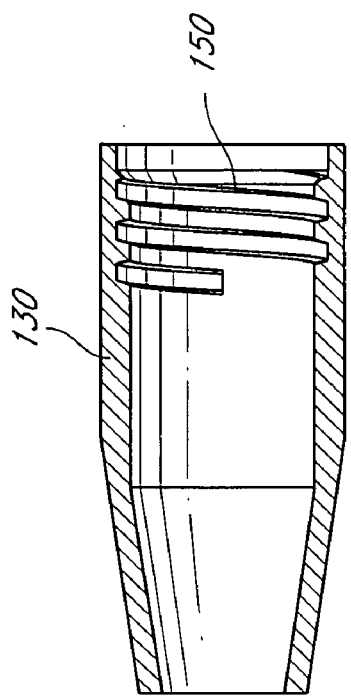
FIG. 16 is a cross section side view of the gas cup of FIG. 15.
Figure 15:
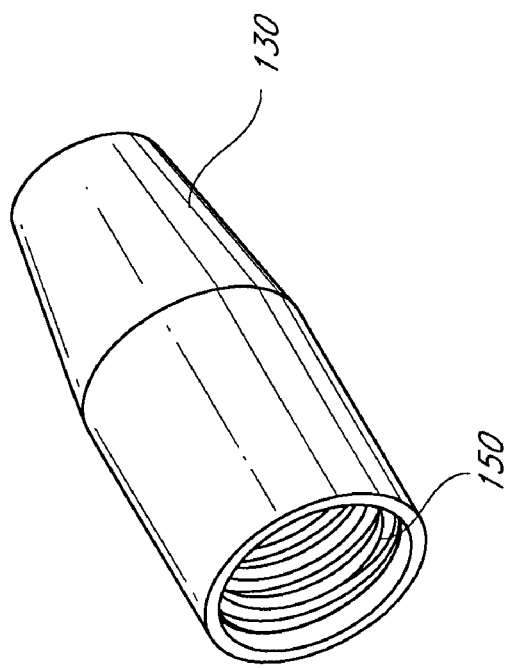
FIG. 15 is a side view of a gas cup according to an embodiment of the present invention.

Since an insulating insert 138 of the welding tip assembly 16 is disposed at the end of the torch barrel 24, the gas cup 130 used in an improved welding tip assembly of the present invention may be machined from a single piece of material, rather than comprised of a swaged multilayer assembly. FIGS. 15 and 16 illustrate a gas cup 130 to be used in the welding tip assembly 16 of the welding gun 10. As depicted, the gas cup 130 has been machined from a single piece of material with an internal threaded portion 150 configured to mate with the threaded portion 140 on the welding tip assembly retainer 136 (FIG. 13). Since the gas cup 130 is a wear item on the welding gun 10, a machined gas cup 130 will lower the costs of manufacture and operation of a welding gun 10 over a multilayer swaged gas cup which includes an insulating insert and interior threaded component.

FIG. 17 depicts an exploded perspective view of the welding tip assembly retainer 136 and its attachment to the insulating insert 138. The insulating insert 138 has an annular recess 172 about its distal end configured to receive a ring spring 170. The ring spring 170 and a proximal end of the insulating insert 138 are configured such that each have a diameter that is greater than an inner diameter of the welding tip assembly retainer 136 at the threaded portion. Thus, once the ring spring 170 affixes the insulating insert 138 to the welding tip assembly retainer 136, very little movement of the insulating insert 138 relative to the welding tip assembly retainer 136 is permitted.

The insulating insert 138 may be chosen of a material with the desired electrical and heat insulating properties. Preferably, the insulating insert is comprised of glass fiber material. Since the insulating insert 138 is connected to the welding tip assembly 16 and the torch barrel 24 with a ring spring 170 and a spring clip 134, the insulating insert 138 may be easily removed and replaced should it wear. Therefore, the welding tip assembly 16 construction advantageously allows for independent removal and replacement of either the gas cup 130 or the insulating insert 138 as either become worn.

In certain embodiments of the present invention, the insulating insert 138 of the present invention may be configured to substantially prevent rotation between the welding tip assembly 16 relative to the torch barrel 24. The insulating insert 138 has an elevated feature 178 near its proximal end 176. As depicted in FIG. 17, the elevated feature 178 of the insulating insert 138 is a raised generally hexagonal section, although it should be recognized that other configurations of elevated features are contemplated within the scope of the present invention. The elevated feature 178 mates with a corresponding recessed feature in an interior cavity of the welding tip assembly retainer 136. This mating of corresponding features substantially prevents rotation of the welding tip assembly retainer 136 with respect to the insulating insert 138.

FIG. 18 shows an end view of the proximal end 176 of the insulating insert 138 according to certain embodiments of the present invention configured to prevent rotation of the insulating insert 138 relative to the torch barrel 24. As depicted, a passage through the insulating insert 138 has a substantially square profile 180 on the proximal end 176 of the insulating insert 138, but a substantially circular profile 182 on the distal end 174 of the insulating insert 138. The gas nozzle 37 (FIGS. 13 and 14) has a raised portion, such as a raised substantially hexagonal portion at its proximal end (FIG. 13). The substantially square profile 180 of the insulating insert 138 may be configured to mate with the raised portion of the gas nozzle 37 to prevent rotation of the insulating insert 138 relative to the gas nozzle 37. Thus, even when the gas cup 130 is attached and removed from the welding tip assembly retainer 136, the welding tip assembly retainer 136 will not rotate with respect to the torch barrel 24. Advantageously, preventing rotation of the welding tip assembly 16 relative to the torch barrel 24 greatly reduces the incidence of a gas cup 130 becoming stuck during installation or removal.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A welding gun comprising:
   a generally tubular portion comprising a substantially rigid housing;
   a wire feed mechanism within the generally tubular portion;
   a motor that drives the wire feed mechanism; and
   a torch portion, the torch portion comprising:
      a torch barrel having a proximal end coupled to the generally tubular portion and a distal end opposite the proximal end; and
      an elongate variable profile insulating boot disposed around the torch barrel and extending along the torch barrel from a location near the proximal end to a location near the distal end, said boot having a thickness which varies along its length; and
      wherein the distal end of the torch barrel is configured to receive a welding tip assembly.

2. The welding gun of claim 1, wherein the variable profile insulating boot is comprised of a moldable material.

3. The welding gun of claim 1, wherein the variable profile insulating boot has a first thickness at an end of the insulating boot adjacent to the welding tip assembly and a second thickness at an end of the insulating boot adjacent to the generally tubular portion of the welding gun.

4. The welding gun of claim 1, wherein the variable profile insulating boot has been shaped to achieve a predetermined outer configuration of the welding gun.

5. The welding gun of claim 4, wherein the predetermined outer configuration is a shape that is continuous with the substantially rigid housing.

6. The welding gun of claim 3, wherein the second thickness is greater than the first thickness.

7. The welding gun of claim 3, wherein the first thickness is about 1/16 inches and the second thickness is about 1/4 inches.

8. The welding gun of claim 3, wherein the variable profile insulating boot has a gradual profile change from an end of the insulating boot adjacent to the welding tip assembly to an end of the insulating boot adjacent to the generally tubular portion of the welding gun.

9. The welding gun of claim 1, wherein the variable profile insulating boot is comprised of a material retaining insulating properties at temperatures over 400° F.

10. The welding gun of claim 1, wherein the variable profile insulating boot is comprised of silicone rubber.

11. The welding gun of claim 1, wherein the substantially rigid housing defines a length, wherein the motor extends along the length of the substantially rigid housing, and wherein the welding gun further comprises a speed control mechanism for the motor electrically coupled to the motor, the speed control mechanism comprising:
   a control unit positioned within the generally tubular portion; and
   a user input mechanism coupled to the control unit and positioned in a first recess in the substantially rigid housing.

12. The welding gun of claim 11, wherein the first recess and the user input mechanism are configured to avoid unintentional adjustment of the user adjustment mechanism while the welding gun is in operation.

13. The welding gun of claim 11, wherein the first recess is located at a position on the generally tubular portion that is located approximately under a palm of a user while the user is operating the welding gun.

14. The welding gun of claim 11, further comprising a second recess in the substantially rigid shell located such that the user input mechanism is accessible from the first recess and the second recess.

15. The welding gun of claim 14, wherein the first recess, the second recess, and the user input mechanism are configured to avoid unintentional adjustment of the user adjustment mechanism while the welding gun is in operation.

16. The welding gun of claim 15, wherein the first recess is located at a position on the generally tubular portion that is located approximately under a palm of a user while the user is operating the welding gun and the second recess is located at a position on the generally tubular portion longitudinally even with the first recess and angularly 180° opposite the first recess with respect to the generally tubular portion.

17. The welding gun of claim 11, wherein the control unit comprises a rotary potentiometer, and the user input mechanism comprises a control wheel.

18. The welding gun of claim 17, wherein the rotary potentiometer has an adjustment range of at least 2 revolutions.

19. The welding gun of claim 1, wherein the wire feed mechanism comprises:
an idler roller;
a feeder roller;
a block configured to support the idler and feeder rollers such that they rotate about axes that extend transversely to a longitudinal axis of the generally tubular portion;
wherein the idler roller is disposed on a pivotable lever such that the idler roller is configured to be pivotable away from the feeder roller without opening the substantially rigid housing.

20. The welding gun of claim 19, wherein the idler roller is pivotable between a first position and a second position, wherein in the first position, the idler roller is positioned to maintain contact between a wire being fed by the wire feed mechanism and the feeder roller, and wherein in the second position, the idler roller is separated from the feeder roller such that the wire is not held in contact with the feeder roller.

21. The welding gun of claim 20, wherein the idler roller is biased towards the first position.

22. The welding gun of claim 20, wherein the wire feed mechanism further comprises a coil spring configured to bias the idler roller towards the first position.

23. The welding gun of claim 19, the gun further comprising a depressible portion configured to allow a user to pivot the pivotable lever without opening the substantially rigid housing.

24. The welding gun of claim 23, wherein the depressible portion is part of the substantially rigid housing.

25. A welding gun comprising:
a generally tubular portion comprising a substantially rigid housing, the substantially rigid housing defining a length;
a wire feed mechanism within the generally tubular portion;
a motor that drives the wire feed mechanism, the motor extending along the length of the substantially rigid housing;
a speed control mechanism for the motor electrically coupled to the motor, wherein the speed control mechanism comprises:
a control unit positioned within the generally tubular portion; and
a user input mechanism coupled to the control unit and positioned in a first recess in the substantially rigid housing, the first recess positioned in the housing to face the palm of a user when the welding gun is in operation; and
a torch portion, the torch portion comprising a torch barrel having a distal end configured to receive a welding tip assembly.

26. The welding gun of claim 25, wherein the first recess and the user input mechanism are configured to avoid unintentional adjustment of the user adjustment mechanism while the welding gun is in operation.

27. The welding gun of claim 25, wherein the control unit comprises a rotary potentiometer, and the user input mechanism comprises a control wheel.

28. The welding gun of claim 27, wherein the rotary potentiometer has an adjustment range of at least 2 turns.

29. The welding gun of claim 25, wherein the torch portion further comprises a variable profile insulating boot disposed around the torch barrel.

30. A welding gun comprising:
a housing;
a wire feed mechanism within the housing;
a motor that drives the wire feed mechanism;
a speed control mechanism for the motor electrically coupled to the motor, wherein the speed control mechanism comprises:
a control unit positioned within the housing; and
a user input mechanism coupled to the control unit and accessible to a user from a first exposed recess and a second exposed recess in the housing; and
a torch portion, the torch portion comprising a torch barrel having a distal end configured to receive a welding tip assembly.

31. The welding gun of claim 30, wherein the first recess, the second recess, and the user input mechanism are configured to avoid unintentional adjustment of the user adjustment mechanism while the welding gun is in operation.

32. The welding gun of claim 31, wherein the first recess is located at a position on the generally tubular portion that is located approximately under a palm of a user while the user is operating the welding gun and the second recess is located at a position on the housing longitudinally even with the first recess and angularly 180° opposite the first recess with respect to the generally tubular portion.

33. The welding gun of claim 30, wherein the control unit comprises a rotary potentiometer, and the user input mechanism comprises a control wheel.

34. The welding gun of claim 33, wherein the rotary potentiometer has an adjustment range of at least 2 turns.

35. The welding gun of claim 30, wherein the torch portion further comprises a variable profile insulating boot disposed around the torch barrel.

36. A welding gun comprising:
a generally tubular portion comprising a housing;
a wire feed mechanism within the housing;
a motor that drives the wire feed mechanism; and
a torch portion, the torch portion comprising:
a torch barrel configured to receive a welding tip assembly; and
wherein the wire feed mechanism comprises:
an idler roller;
a feeder roller; and
a body configured to support the idler and feeder rollers such that they rotate about axes that extend transversely to a first longitudinal axis of the generally tubular portion; and wherein the idler roller is disposed on a pivotable lever such that the idler roller is configured to be pivotable away from the feeder roller without opening the housing; and wherein the welding gun further comprises a depressible portion configured to allow a user to pivot the pivotable lever without opening the housing.

37. The welding gun of claim 36, wherein the idler roller is pivotable between a first position and a second position, wherein in the first position, the idler roller is positioned to maintain contact between a wire being fed by the wire feed mechanism and the feeder roller, and wherein in the second position, the idler roller is separated from the feeder roller such that the wire is not held in contact with the feeder roller.

38. The welding gun of claim 37, wherein the idler roller is biased towards the first position.

39. The welding gun of claim 37, wherein the wire feed mechanism further comprises a coil spring configured to bias the idler roller towards the first position.

40. The welding gun of claim 36, wherein the depressible portion is part of the housing.

41. A welding gun comprising:
   a generally tubular portion comprising a substantially rigid housing;
   a wire feed mechanism within the generally tubular portion;
   a motor that drives the wire feed mechanism;
   a torch portion, the torch portion comprising:
      a torch barrel;
      a variable profile insulating boot disposed around the torch barrel; and
      wherein the torch barrel is configured to receive a welding tip assembly; and
   a speed control for the motor electrically coupled to the motor, wherein the speed control mechanism comprises:
      a control unit positioned within the generally tubular portion; and
      a user input mechanism coupled to the control unit and positioned in a first recess in the substantially rigid housing; and
   wherein the wire feed mechanism comprises:
      an idler roller;
      a feeder roller;
      a block configured to support the idler and feeder rollers such that they rotate about axes that extend generally perpendicular to a longitudinal axis of the generally tubular portion; and
   wherein the idler roller is disposed on a pivotable lever such that the idler roller is configured to be manually pivotable away from the feeder roller without opening the substantially rigid housing.

* * * * *